US011442711B2

(12) United States Patent
Bagadia et al.

(10) Patent No.: US 11,442,711 B2
(45) Date of Patent: Sep. 13, 2022

(54) SERIAL ORDERING OF SOFTWARE OBJECTS WITH CYCLIC DEPENDENCIES

(71) Applicant: SAP SE, Walldorf (DE)

(72) Inventors: Yash Bagadia, Bangalore (IN); Harikrishnan Mangayil, Bangalore (IN); Abhishek Nagendra, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/114,332

(22) Filed: Dec. 7, 2020

(65) Prior Publication Data

US 2022/0179627 A1 Jun. 9, 2022

(51) Int. Cl.
*G06F 9/445* (2018.01)
*G06F 8/41* (2018.01)
*G06F 16/28* (2019.01)
*G06F 16/901* (2019.01)

(52) U.S. Cl.
CPC .......... *G06F 8/433* (2013.01); *G06F 9/44521* (2013.01); *G06F 16/289* (2019.01); *G06F 16/9024* (2019.01)

(58) Field of Classification Search
CPC .... G06F 8/433; G06F 16/289; G06F 16/9024; G06F 9/44521
See application file for complete search history.

(56) References Cited

U.S. PATENT DOCUMENTS

| | | | |
|---|---|---|---|
| 7,546,593 B2 | 6/2009 | Petev et al. | |
| 8,612,960 B2 | 12/2013 | Petev et al. | |
| 9,621,673 B2 | 4/2017 | Said et al. | |
| 9,710,593 B1* | 7/2017 | Keller | G06F 30/398 |
| 10,025,568 B2 | 7/2018 | Mayer et al. | |
| 10,203,952 B2 | 2/2019 | Schildt et al. | |
| 10,601,908 B1* | 3/2020 | Ragupathy | H04L 41/12 |
| 2008/0040367 A1* | 2/2008 | Bitonti | G06F 16/289 |

(Continued)

OTHER PUBLICATIONS

U.S. Appl. No. 16/720,209, filed Dec. 19, 2019.

(Continued)

*Primary Examiner* — Ziaul A Chowdhury

(74) *Attorney, Agent, or Firm* — Klarquist Sparkman, LLP

(57) ABSTRACT

Methods and apparatus are disclosed for serializing software objects for loading onto a cloud-hosted tenant, or for other serialized operations. Nodes and edges of a directed graph represent respective software objects and the dependencies among the software objects. A search for strongly connected components reveals cyclic dependencies. Each strongly connected component can be replaced by a contracted node to obtain a condensation of the original directed graph. A topological ordering can be determined for the condensation, and the software objects can be processed or loaded according to the topological ordering. Such ordering provides that software objects of a strongly connected component are processed consecutively while, for all other dependencies, a prerequisite object is processed (loaded) before its dependent object(s). Examples of SAP Analytics Cloud and Data Warehouse Cloud are provided. Exemplary, push and pull loading procedures, topological ordering, and validation are disclosed.

18 Claims, 10 Drawing Sheets

(56) References Cited

U.S. PATENT DOCUMENTS

| | | | |
|---|---|---|---|
| 2012/0102483 A1* | 4/2012 | Goldman | G06F 8/36 717/174 |
| 2014/0067874 A1 | 3/2014 | Bhattacharjee et al. | |
| 2016/0239276 A1* | 8/2016 | Maclean | G06F 8/443 |
| 2018/0075158 A1* | 3/2018 | Li | G06F 16/9024 |
| 2019/0163797 A1 | 5/2019 | Shetty et al. | |
| 2019/0303474 A1* | 10/2019 | Pragada | G06F 16/24542 |
| 2019/0324888 A1* | 10/2019 | Evans | G06F 11/0709 |
| 2020/0097295 A1* | 3/2020 | Xu | G06F 9/5061 |
| 2021/0191983 A1 | 6/2021 | Teichmann et al. | |
| 2021/0318989 A1 | 10/2021 | Nagendra et al. | |
| 2021/0328998 A1 | 10/2021 | Mangayil et al. | |
| 2021/0349870 A1 | 11/2021 | Mangayil et al. | |

OTHER PUBLICATIONS

U.S. Appl. No. 16/867,304, filed May 5, 2020.
U.S. Appl. No. 16/883,754, filed May 26, 2020.
U.S. Appl. No. 16/895,988, filed Jun. 8, 2020.
Cipher Business Solutions, "SAP Analytics Cloud", pp. 1-13, downloaded from https://www.cipherbsc.com/sap-analytics-cloud/ on Nov. 8, 2020.
Hampp, "How to connect SAP Analytics Cloud and SAP Data Warehouse Cloud", available from https://blogs.sap.com/2020/05/19/how-to-connect-sap-analytics-cloud-and-sap-data-warehouse-cloud/, pp. 1-11 (May 2020).
Jung, "SAP HANA Extended Application Services", available from https://blogs.sap.com/2012/11/29/sap-hana-extended-application-services/, pp. 1-40 (Nov. 2012).
Kaur, "Model/Story building Practices with SAP Analytics Cloud", available from https://blogs.sap.com/2019/07/16/modelstory-building-practices-with-sap-analytics-cloud/, pp. 1-4 (Jul. 2019).
Kilpatrick, "What is SAP Analytics Cloud?", pp. 1-9, downloaded from https://www.sapanalytics.doud/what-is-sap-analytics-cloud/ on Nov. 8, 2020.
Powlas, "How does SAP Data Warehouse Cloud Work Webcast Recap", available from https://blogs.sap.com/2019/06/04/how-does-sap-data-warehouse-cloud-work-webcast-recap/, pp. 1-10 (Jun. 2019).
Qureshi, "SAP Sales Cloud and SAP Service Cloud solution Tenant Landscape Guidance", available fromhttps://www.sap.com/cxworks/article/457634146/sap_sales_and_service_solutions_tenant_landscape_guidance, pp. 1-8 (Nov. 2020).
Rumig, "Multitenancy Architecture on SAP Cloud Platform, Cloud Foundry environment", available from https://blogs.sap.com/2018/09/26/multitenancy-architecture-on-sap-cloud-platform-cloud-foundry-environment/, pp. 1-12 (Sep. 2018).
SAP, "Lifecycle Management in SAP Analytics Cloud", available from https://help.sap.com/doc/6530443d036444749f11278722069e34/release/en-us/Documentation_SAP_SAC_LCM.pdf, pp. 1-11 (apparently dated Feb. 2020).
Shaw, "SAP Analytics Cloud", available from https://wiki.scn.sap.com/wiki/pages/viewpage.action?pageId=545392536 or https://d.dam.sap.com/a/VQ2nHT6, pp. 1-53 (May 2020).
Steyn, "REST your Models on SAP HANA XS", available from https://blogs.sap.com/2013/01/22/rest-your-models-on-sap-hana-xs/, pp. 1-22 (Jan. 2013).
Van De Zand, "Creating a Value Driver Tree with SAP Analytics Cloud", available from https://blogs.sap.com/2018/07/25/creating-a-value-driver-tree-with-sap-analytics-cloud/, pp. 1-4 (Jul. 2018).

* cited by examiner

```
{
  "totalChunks": 5,
  "targetResourceId": "f69d9654-a0",
  "importOptions": 'UPDATE_ALL',
  "parameters": {"includeData": true, "includeAuditData": false},
  "sessionId": "8257a76e-a08",
  "selection": [
  {
    "id": "oA", "provider": "DS:Prov", "type": "LocalTable"
  },
  {
    "id": "oB", "provider": "DS:Prov", "type": "LocalTable"
  },
  {
    "id": "oC", "provider": "DS:Prov", "type": "LocalTable"
  },
  {
    "id": "oJ", "provider": "DS:Prov", "type": "LocalTable"
  },
  {
    "id": "oD", "provider": "DS:Prov", "type": "LocalTable"
  },
  {
    "id": "oF", "provider": "DS:Prov", "type": "LocalTable"
  },
  {
    "id": "oE", "provider": "DS:Prov", "type": "LocalTable"
  },
  {
    "id": "oK", "provider": "XS:Prov1", "type": "View"
  }
  {
    "id": "oH", "provider": "DS:Prov", "type": "LocalTable"
  },
  {
    "id": "oG", "provider": "XS:Prov2", "type": "View"
  } ],
  "selectedIndex": 6,
  "cycle": [4, 5, 6],
  "content": "Xj5e7yuUIj . . .
                        . . . 4nbO9Mkic3"
}
```

*FIG. 10*

SERIAL ORDERING OF SOFTWARE OBJECTS WITH CYCLIC DEPENDENCIES

BACKGROUND

Recent years have seen an increased demand for replicating or scaling a software environment across multiple computing hosts or across geographically distributed sites. This increase has been fueled by dramatic growth of network-centric computing, virtual computing, and scalable cloud environments, together with the emergence of new paradigms for extracting intelligence from data.

Often, a software environment can incorporate a mix of software objects which can have dependencies among themselves. Accordingly, it can be desirable to check that the dependencies of all the software objects are satisfied (i.e. that any prerequisite objects are also present) before activating a new instance of the software environment. However, the dependencies can form one or more cycles. Conventional technologies can perform validation of dependencies after all software objects have been loaded, which can be wasteful of computing and network resources, particularly when there are a large number of software objects in the instantiated environment. Other conventional technologies can skip validation when cyclic dependencies are present, which runs the risk of costly runtime failures as and when a missing dependency is encountered.

Accordingly, there remains a need for improved technologies for distribution, replication, or other processing of software packages whose component objects can have cyclic dependencies.

SUMMARY

In brief, disclosed embodiments employ graph technologies to develop a serial ordering of software objects in the presence of one or more dependency cycles. Edges of a directed graph can represent dependencies between nodes representing respective software objects. A dependency cycle can be manifested as a strongly connected component of the graph. Replacement of each strongly connected component by a contracted node can generate a condensation of the original graph which is a directed acyclic graph and can be topologically ordered. Listing the software objects according to the topological order of their respective graph nodes can result in a serial order of the software objects. The software objects can be loaded or otherwise processed in this serial order. The serial order can have properties that objects of a strongly connected component are processed consecutively, while for all other dependencies, a prerequisite object is processed (loaded) before its dependent object(s).

In certain examples, the disclosed technologies can be implemented as a method of serially processing a plurality of software objects having one or more cyclic dependencies. A graph has nodes and directed edges respectively representing the software objects and pairwise dependencies therebetween. A condensation of the graph having a topological order is obtained. The condensation incorporates a contracted node representing a strongly connected component of the graph. The software objects are processed serially according to the topological order.

In some examples, the contracted node can represent the nodes of the strongly connected component and can further represent corresponding software objects. The contracted node can have a given position in the topological order. The processing, upon reaching the given position, can process processes the corresponding software objects serially before proceeding to any positions in the topological order that follow the given position. First and second nodes can represent first and second software objects respectively, the second object can be dependent on the first object, and the position of the second node in the topological order can be later than the position of the first node in the topological order.

In additional examples, processing the software objects can include loading the software objects. The method can also include validating dependencies of the loaded software objects. The contracted node can represent the nodes of the strongly connected component and can further represent corresponding software objects. The validating dependencies among the corresponding software objects of the contracted node can be deferred until all the corresponding software objects have been loaded. The validating dependencies among the corresponding software objects can be performed before all of the software objects have been loaded.

In further examples, the software objects can include one or more stories, models, dimensions, connections, or value-driver trees. The software objects can include one or more database objects. In some examples, the strongly connected component can be a first strongly connected component, the contracted node can be a first contracted node, and the condensation of the graph can also include a second contracted node representing a second strongly connected component of the graph. The first and second strongly connected components can be disjoint.

In certain examples, the disclosed technologies can be implemented as computer-readable media storing instructions which can be executed by one or more hardware processors to cause the hardware processors to perform certain operations. A graph has nodes representing a plurality of software objects and directed edges representing pairwise dependencies among the software objects. A condensation of the graph is obtained. The condensation has a topological order and incorporates a contracted node representing a strongly connected component of the graph. The software objects are loaded serially onto a target, according to the topological order.

In additional examples, the operations can also include building the graph of the nodes and the directed edges, identifying the strongly connected component within the graph, and determining the topological order of the condensation.

In certain examples, the disclosed technologies can be implemented as a system having one or more hardware processors with coupled memory, and computer-readable storage media storing instructions which, upon execution by the hardware processor(s), cause the hardware processor(s) to perform the following operations. A request is received to load a plurality of software objects having one or more cyclic dependencies. A first graph having first nodes and directed edges is built. The first nodes represent respective software objects, and each edge of the directed edges joins a respective pair of the nodes. Each edge represents a dependency between the respective objects represented by its respective pair of the nodes. One or more strongly connected components of the first graph are identified. The strongly connected components incorporate one or more disjoint respective subsets of the nodes, and represent one or more corresponding subsets of the software objects. A directed acyclic second graph is formed as a condensation of the first graph. The second graph incorporates one or more second nodes. Each second node represents the corresponding subset of the software objects for a respective strongly connected component. A topological ordering of the second graph is determined. A serial loading manifest of the software objects is generated, according to the topological ordering of the second graph. For any of the first nodes present in the second graph, the generating includes placing an entry for the respective object in the serial loading manifest. For each second node, the generating includes expanding the second node into a serial list of the corresponding subset of software objects, and placing the serial list in contiguous locations within the serial loading manifest. The plurality of software objects are loaded serially as ordered in the serial loading manifest.

In some examples, the operations can also include transmitting the serial loading manifest to a target. The target can control the loading operation using the serial loading manifest. The target can be a tenant in a cloud infrastructure. Some or all of the hardware processors can be in a cloud-hosted content distribution network. The receiving, building, identifying, forming, determining, generating, and loading actions can be performed by a content management service. The loading can be a push action to a target.

In further examples, the serial loading manifest can identify one or more repositories from which the plurality of software objects can be loaded. Each software object can be accompanied by a respective document identifying the instant software object within the serial loading manifest.

In additional examples, the corresponding subset of software objects for a given second node can include a first software object. The document accompanying the first software object can identify the corresponding subset of the software objects.

The foregoing and other objects, features, and advantages of the invention will become more apparent from the following detailed description, which proceeds with reference to the accompanying figures.

BRIEF DESCRIPTION OF THE DRAWINGS

FIG. 10 depicts a composite example document suitable for use with the disclosed technologies.

DETAILED DESCRIPTION

Introduction and Overview

1. SAP Analytics Cloud

Figure 1:
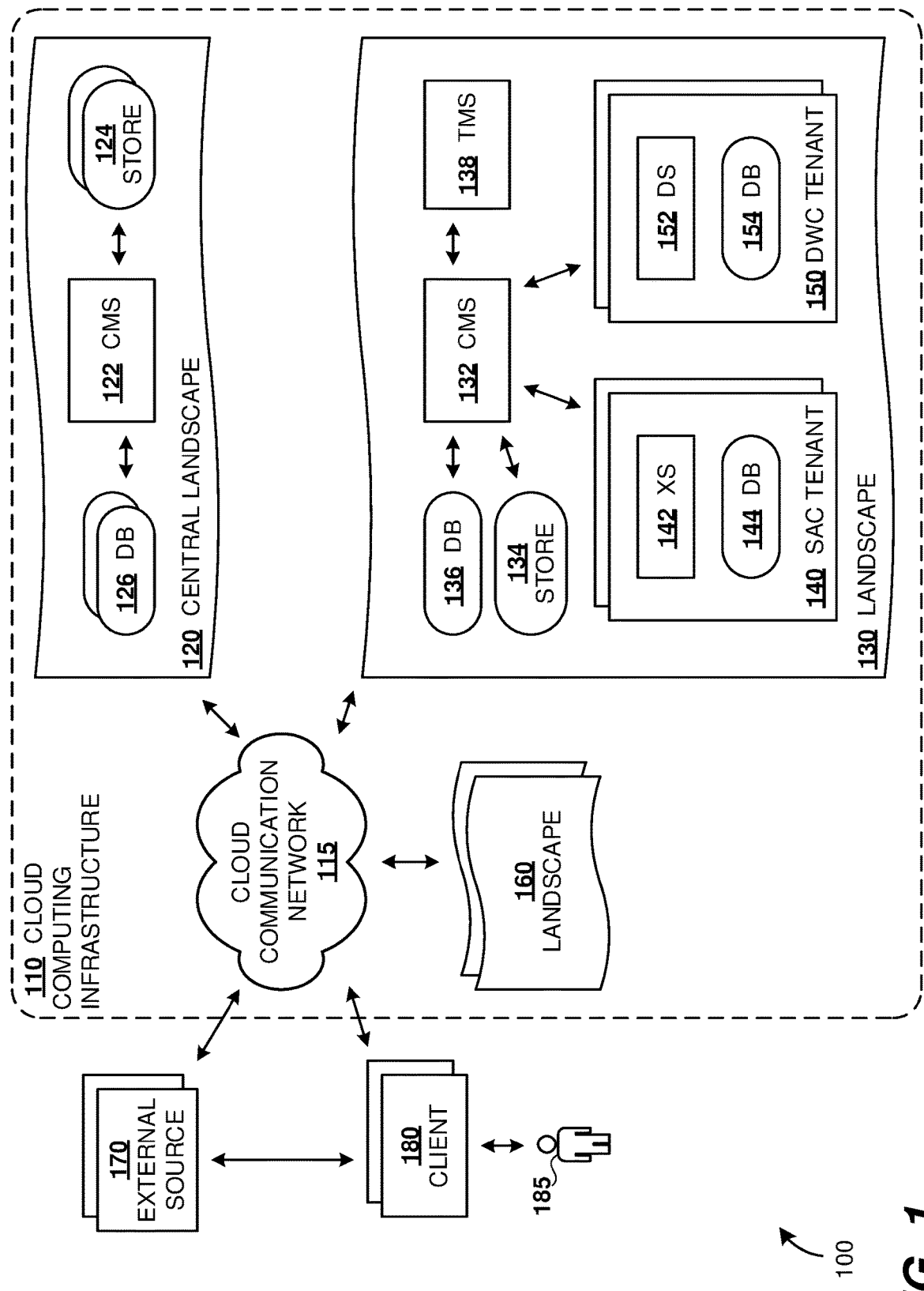
FIG. 1 is a block diagram of an example system architecture suitable for implementing some examples of the disclosed technologies.

The SAP Analytics Cloud (SAC) builds upon the successes of the earlier SAP Data Warehouse Cloud (DWC) to provide sophisticated planning and predictive capabilities in a cloud environment. A SAC environment can include tenant clusters hosted in landscapes within a cloud infrastructure as described further herein. Often, it can be desirable for content producers (which can be tenants or other sources of content) to export content, either directly to content consumers (which can be tenants within a SAC landscape) or to repositories within SAC. Similarly, it can be desirable for content consumers (e.g. tenants) to import content, either directly from content producers or from repositories within SAC. While SAC provides a convenient context for illustration, the disclosed technologies are not so limited, and can be applied in numerous other contexts.

2. Content Packages

Often, content can be organized as packages, each package containing a number of often heterogeneous content types which collectively can provide a complete analytic solution or software working environment. Because one content object (a dependent object) can reference another content object (a prerequisite object), the content objects of a package can have pairwise dependencies among themselves.

3. Cyclic Dependencies

Dependency cycles can arise in various circumstances. In the case of a relational database, a table Table_1 can have a column which is its primary key, and another column which is dependent on the primary key of Table_2. Meanwhile Table_2 can also have a column which is dependent on the primary key of Table_1. Thus Table_1 references Table_2 and is dependent on Table_2. However, Table_2 also references Table_1 and is dependent on Table_1. Thus, Table_1 and Table_2 have a simple cyclic dependency. More complex cyclic relationships among database tables can be similarly demonstrated, such as: Table_1→Table_2→Table_3→Table_4→Table_1 (to be read as Table_1 is a prerequisite of Table_2, Table_2 is a prerequisite of Table_3, and so on).

4. Condensation Graph

Example of the disclosed technology represent dependencies among software objects as a directed graph, with nodes representing respective software objects and a relationship such as node A being a prerequisite for node B represented as a directed edge from node A to node B. If the directed graph has one or more cycles, then it may not support an ordering of the nodes. However, by detecting cycles and replacing each strongly connected component with a respective contracted node, the original graph can be reduced (or, condensed) into a condensation graph, which is a directed acyclic graph. The condensation is directed because all edges are derived from directed edges of the original graph. The condensation is acyclic because, if any cycle were present, it would have been replaced by a contracted node.

5. Topological Ordering

Unlike the original cyclic graph, a DAG can support ordering, and a topological ordering can be determined for the condensation graph. In some examples, a topological ordering can be used in which each node of the condensation graph is assigned a number, such that every edge of the condensation graph leads from a smaller number to a larger number. That is, a prerequisite in the condensation graph has a lower number and is earlier in the topological ordering than a node dependent on it.

6. Serial Loading

The software objects can be loaded according to the topological order, e.g. lower numbers before higher numbers, so that a prerequisite node in the condensation graph is loaded before a node dependent on it. Contracted nodes in the condensation graph can be expanded into their constituent original nodes, and the corresponding software objects can be loaded consecutively at the position (in the topological order) of the corresponding contracted node.

7. Serialization Properties

One or both of these properties—namely, loading cyclically dependent objects together, and otherwise loading prerequisite objects before their dependent objects—can be desirable for making dependency validation more efficient, allowing dependency problems to be detected early in a complex loading sequence.

A further property which can be desirable is to have a reproducible serial order. In some examples, two or more software objects can share a common index number in a topological ordering, either because they inherit the same number from a common contracted node, or because the underlying topological ordering of the condensation graph itself allows duplicated numbers. Generally, nodes having duplicate serial numbers can be associated with cases where the precise ordering between such nodes doesn't matter. Still, to obtain reproducibility, some examples of the disclosed technologies can enforce a rule for serializing between such nodes or objects sharing a common index number. Simple examples of such a rule can be to serialize commonly numbered objects according to alphanumeric order of object names or other identifier strings. Then, a serialized order of a graph can be made reproducible, so that the same serialized order is used every time a given package is loaded. A reproducible serial order can facilitate debugging.

8. Other Applications

Loading of content objects in a SAC environment is just one application of the disclosed technologies. Similar scenarios and considerations can be encountered in diverse applications. Cyclic dependencies among database tables can be encountered in general database applications, not necessarily related to analytics nor hosted in a cloud. Thus, replication of a relational database in any circumstance can benefit from the disclosed technologies. Beyond databases and analytic content, general software environments are often replicated or migrated during the lifecycle of a software application. Replication or migration can occur in the context of creating a hot standby, in the context of scaling data center or web applications, or geographic migration. Still further, software packages can be distributed in the form of source code, which may require compiling and linking on the target to conform with varying hardware or software characteristics on different platforms. Linkers can be subject to dependency cycles as references in one library can reference another library and vice versa. Accordingly, distribution of source code packages can also benefit from the disclosed technologies. Other packages of software can also exhibit cyclic dependencies.

Terminology

The usage and meaning of all quoted terms in this section applies throughout this disclosure unless clearly indicated otherwise or repugnant to the context. The terminology below extends to related word forms.

The term "analytic content" refers to content used for or generated by analysis of input data. The content can include data items, such as the input data itself (e.g. one or more database tables or views), intermediate data (e.g. one or more models), or output data (e.g. one or more stories). Some exemplary analytic content data objects can include connections, dimensions, measures, models, and stories. A "connection" is a data structure linking an analysis tool to a local or remote input store of data. A "dimension" is a field or column of input data storing categorical data. A "measure" is a field or column of input data storing numerical data suitable for operation by mathematical or statistical functions. A "model" is an intermediate data object resulting from connecting to one or more input stores of data, identifying fields or columns as measures or dimensions, and/or optionally performing queries or analysis functions on the organized data. A "story" is a data object providing visualization of output from a model. A story can include analyzed output from a model, e.g. in the form of numbers, charts, or tables, and can optionally further include other items such as captions, headings, citations, other text, graphics, or hyperlinks. Numerous other types of analytic content data objects can be used in conjunction with the disclosed technologies. For example, a "value-driver tree" (VDT) is a representation of interdependencies among measures that can be used to estimate the impact a change in one measure may have on another measure. Alternatively or additionally, analytic content can include executable programs or instructions, such as executable queries, analysis tools, or visualization scripts. In some examples, each type of content can be associated with a respective provider.

A "client" is a hardware or software computing entity that uses a resource provided by another hardware or software computing entity dubbed a "server." Some clients can operate interactively with a user, providing prompts, information, or output to the user, or receiving input from the user, however this is not a requirement. Other clients can operate in an unattended or head-less mode.

A "cloud" is a multi-processor computing resource, accessible off-premises to multiple users over a public network such as internet, in which the users may not have control over which particular processors their applications are executed on.

The unqualified term "data" refers to any digital representation of information.

A "database" or "database system" is an organized collection of data maintained on computer-readable media and accessible by execution of instructions at one or more processors. Databases can be relational, in-memory or on disk, hierarchical or non-hierarchical, or any other type of database. A database can store an original or master copy of one or more data items. In some examples, a master copy of a data item can be stored in a table (or, "base table") which can be a data structure organized in rows and columns, with rows representing respective records and columns representing respective fields for these records.

A "dependency" between two software objects oP, oQ is a directed relationship indicating that one of the software objects may not function correctly without the other. In this disclosure, object oP being dependent on object oQ is denoted as oP➔oQ (the closed-head arrow signifying "depends on") or oQ→oP (the open-headed arrow signifying "is a prerequisite for"). This dependency can be associated with object oP having an explicit reference to object oQ. To illustrate, object oQ can be further dependent on object oR (that is, oR→oQ). Although object oP is indirectly dependent on oR, the composite relationship oR→oQ→oP can satisfactorily capture the indirect dependence, and a separate relationship oR→oP can be omitted. In some examples of interest, dependencies among a group of software objects can form one or more cycles. However, this is not a requirement, and the disclosed technologies can be operated uniformly with cyclic or acyclic dependency graphs. A "dependency of [object oP]" refers to a relationship between object oP and another object that is a prerequisite of object oP, and to the prerequisite object itself. Thus, the relationship oQ→oP is a dependency of oP and is not a dependency of oQ. Object oQ can be said to be a dependency of oP but, based on this relationship, oP would not be a dependency of oQ.

A "graph" is a set of two or more nodes and a set of one or more edges joining respective pairs of the nodes. In disclosed examples, the edges can be directed (e.g. where one node is dependent on another node, often represented with single-ended arrows), and the graph is dubbed a "directed graph." Generally, the graphs described herein are directed graphs. A directed graph can have bidirectional dependencies between a given pair of nodes, represented as two antiparallel directed edges between the two nodes. Directed edges can be traversed from one node to the next to form a "path." A "cycle" is a path of two or more nodes in a graph that begins and ends at a same node. A directed graph having one or more cycles is a cyclic graph. A directed graph having no cycles is a "directed acyclic graph" (DAG). Two portions of a graph having no common nodes are "disjoint." Two distinct strongly connected components are disjoint. A graph is a logical structure and can be implemented using any of various types of data structures to track nodes and edges (e.g. linked lists, arrays). A graph or a graph data structure is a model of other entities (such as software objects, including analytical content objects) and the relationships therebetween. The graphs described herein can be represented or stored as a data structure, and the term graph extends to such a data structure. Nodes of a graph are sometimes referred to herein by upper case letters (A, B, C), and the respective objects they represent are referred to as oA, oB, oC. Inasmuch as some graph nodes have a 1:1 correspondence with respective software objects, descriptions of nodes herein often apply to software objects, and vice versa. Serial positions of nodes A, B, C are sometimes denoted as pA, pB, pC and can be numbers.

The term "import" refers to an action of loading one or more software objects from a source or repository onto a target. The term "export" refers to an action of providing one or more software objects to a repository or target from a source.

A "landscape" is an organizational unit of a distributed computing environment within which a plurality of hardware or virtual processors, or computing systems, host software applications. Virtual computing systems of a landscape can host tenants. The computing resources within a landscape can share resources, such as a communication gateway, a management system, or storage facilities. Examples of the disclosed technologies can be implemented within cloud-hosted landscapes, such as SAP Analytic Cloud (SAC), but this is not a requirement, and a landscape can be fixedly implemented within a particular data center.

"Loading" refers to actions of storing or installing one or more software objects at a target. In some examples, loading can be performed as a "pull" operation under control of the target while, in other examples, loading can be performed as a "push" operation controlled by a controller external to the target.

A "manifest" is a data structure or document that identifies or lists actions to be performed, or which identifies or lists graph nodes or software objects to be processed. A manifest can optionally include additional fields specifying configuration, dependencies, or additional metadata. Each graph node, software object, or action can be identified by a respective "entry" within the manifest. A manifest can optionally include additional information for one or more of the entries, such as a repository from which one or more software object can be retrieved, a type of the software object, or a dependency with another of the software objects. A "serial manifest," such as a "serial processing manifest" or "serial loading manifest," is a manifest indicating a serial ordering of the software objects, graph nodes, or actions.

A "network" is a collection of interacting hardware devices coupled by communication channels, and can refer, without limitation, to a computing network, a communication network, a storage network, or a content distribution network, which are not mutually exclusive. For example, SAP Analytics Cloud can be implemented on a cloud-hosted computing network, can include local or distributed storage networks, and can further include communication networks for coupling SAC landscapes to one another or for coupling devices within a single landscape. Often, a networked hardware device can include a "network interface" to couple a hardware processor or other functional unit within the hardware device to a communication channel.

In the context of serialized software objects, the term "processing" can refer to loading, linking, or other operations that can be sensitive to dependencies between the software objects.

The term "provider" refers to an executable software module configured to perform at least administrative functions for one or more software objects or types of software objects. A provider enables integration of its associated software objects with an application environment. In some examples, SAC content objects can have respective providers for each type of content object. In further examples, DWC content objects can have a DWC provider. A provider can be local to a tenant, however this is not a requirement, and in other examples a provider can be central to a landscape, e.g. within a central management system instance, or even external to an instant landscape. Providers for different types of software objects can be located on an instant tenant, within another tenant of an instant landscape, centrally within an instant landscape, or external to the instant landscape, in any combination. A provider's administrative functions can include validation of associated software objects, control of storage or updates of associated software objects, registration of associated software objects within an application environment. In some examples, a provider can incorporate functional logic related to one or more associated software objects, such as (a) providing a service using the software object, or (b) for executable software objects, handling calls or requests from the software object itself.

The terms "receive" and "transmit" refer to communication over a network, which can be in the form of a message.

The communication can be electromagnetic, e.g. over wired, wireless, or optical media, but this is not a requirement.

The term "serial" refers to actions performed sequentially according to a specified order. In some examples of the disclosed technologies, actions, graph nodes, or software objects are assigned serial numbers (e.g. 0, 1, 2, 3, . . . ), and the actions, graph nodes, or software objects can be handled in the numerical order of the serial numbers. In further examples, the numbers need not be unique. To illustrate, objects oA, oB, oC, oD, could be assigned serial numbers 2, 1, 1, 0, respectively, and either ordering "oD oC oB oA" or "oD oB oC oA" would be according to the specified order. The order can be specified by a topological sort on a DAG. In additional examples, a serial manifest can indicate a serial order in which graph nodes or software objects are to be processed.

"Software" refers to computer-executable programs or instructions and associated data structures. Software can be in active or quiescent states. In an active state, software can be loaded into memory or undergoing execution by one or more processors. In a quiescent state, software can be stored on computer-readable media, awaiting transmission or execution.

A "software object" can be a data object or a module of program instructions (source code or executable instructions). A "data object" occupies some memory or storage space at runtime, in which one or more items of data are stored, and that is directly or indirectly accessible by a software application. Thus, data objects exclude metadata. Some examples of software objects include analytic content objects or data objects that are part of a database environment. The disclosed technologies can also be used with other types of software objects. The life cycle of a software object or a package of software objects can include generation at a source, export to a repository, storage at the repository, import to a tenant, storage at the tenant, updates variously at the source, repository, or tenant, and/or eventual destaging.

The term "source" can refer to computing hardware or software at which a software object originates. The software object can be transmitted and stored at a repository, or loaded onto a target. Some sources can be within a same cloud environment as a repository or target, while other sources can be outside such cloud environment.

A "store" or "repository" is an organization of data objects in a data storage apparatus.

A set of two or more nodes {N} of a directed graph is "strongly connected" if any pair of nodes (N1, N2) in {N} has a path leading from N1 to N2 and a path leading from N2 to N1. A "strongly connected component" is a maximal strongly connected set {N}. That is, if the graph has one or more other nodes {N'}, disjoint from {N}, all of which have paths to and from {N}, then the union {N} U {N'} is also strongly connected and {N} is not a strongly connected component. If there are no such nodes {N'}, then {N} is a strongly connected component. With reference to FIG. 4B, the set of nodes {D, E} is strongly connected but is not a strongly connected component, because the set can be enlarged by adding node F, while maintaining its strongly connected property. In some disclosed examples a strongly connected component can be replaced by a single node dubbed a "contracted node." If a directed graph has at least one strongly connected component, and all strongly connected components are replaced by respective contracted nodes, the resulting graph is dubbed a "condensation graph" (or simply a "condensation") of the original graph. A condensation graph is a directed acyclic graph.

The term "target" can refer to any computing hardware or software that can receive a software object according to the disclosed technologies. In some disclosed examples, a target can be a tenant (illustratively, a virtual processor or a database instance) in a cloud environment. However, this is not a requirement, and the disclosed technologies can be implemented with targets that are implemented on dedicated physical hardware in a datacenter. Moreover, the disclosed technologies can be implemented with targets on computing systems shared among multiple software applications or business processes.

A "tenant" is a virtual computing environment dedicated to one or more specified software applications or business processes. In some examples, a tenant can run analytics software, or can implement a database instance. Examples of the disclosed technology can be implemented with a tenant in a cloud-hosted landscape, however this is not a requirement. A tenant can be implemented on dedicated physical hardware in a datacenter.

A "topological order" of a directed acyclic graph is an assignment of a respective serial position pN to every node N such that if two nodes U, V have an edge then the serial position pU of node U precedes the serial position pV of node V. In some examples, the serial position can be designated by an integer value, another numerical value, or an alphanumeric value, and the precedence of the serial positions can be according to a numerical or alphanumeric ordering of these values. Particularly, processing or loading software objects according to a topological order means that a software object having an earlier serial position can be processed or loaded before another software object having a later serial position. In some examples, a topological ordering can be a total order, meaning that no two nodes share a common position, while in other examples a topological order can be a partial order in which two nodes can have a same serial position. In some instances, two nodes with a same serial position can indicate that there is no dependency between the two nodes, and the order in which these two nodes are processed or loaded is immaterial. Nodes Q, R of FIG. 3B are two such nodes that have no mutual dependencies and could be assigned a common serial position. In other instances, two nodes can be part of a strongly connected component and can inherit the same serial position from the corresponding contracted node. In the context of a topological order or serialized software objects, the term "position" refers to the serial position within a topological order. For any directed graph having a branch (that is, at least one node has a plurality of prerequisites, at least one branch a prerequisite of a plurality of nodes) or a cycle, a topological ordering is not unique.

In the context of object dependencies, the term "validating" refers to an operation of checking that all dependencies of a given object are present. With reference to FIG. 3B, node S has a single prerequisite node R. Thus, if nodes S, R represent software objects oS, oR respectively, then validating dependencies of object oS can refer to checking that object oR is present. Thus, validation of dependencies can be streamlined by loading or processing a prerequisite object before loading or processing before its dependent object(s). In examples, validation can include checking that a correct version of the prerequisite object is present. In some examples, validation for each software object can be performed by a provider for that object or that type of object.

Example System Architecture

FIG. 1 is a block diagram 100 of an example system architecture suitable for implementing disclosed technologies. In this architecture, a cloud computing infrastructure 110 comprises tenants 140, 150 organized in landscapes 120, 130, 160, and is configured to allow tenants to import or export content objects. Components of cloud infrastructure 110 can also interact with clients 180 or external sources 170. Cloud communication network 115 provides a communication infrastructure through which computing systems of cloud infrastructure 110 can transmit or receive data. In some examples, cloud infrastructure can have features similar to an SAP Analytic Cloud (SAC) or an SAP Data Warehouse Cloud (DWC).

As illustrated, cloud infrastructure 110 can be managed by a distributed Central Management System (CMS), one instance 122, 132 of which is located in each landscape 120, 130. A CMS instance 122, 132 can coordinate interactions among the components of its respective landscape 120, 130 and can also mediate interactions with entities outside the instant landscape 120, 130.

Landscape 130 can host multiple tenants, which can be of a common type or of different types, in any combination. Landscape 130 is illustrated hosting a plurality of SAC tenants 140 and a plurality of DWC tenants 150, however this is not a requirement. A landscape can be dedicated to just SAC tenants or just DWC tenants. Where both are present, a DWC tenant and an SAC tenant can be configured to work in tandem and support a single software application environment. Additional tenant types can also be included. Similarly, landscape 110 can be dedicated to a particular customer of the cloud infrastructure 110, or can be shared among multiple customers. The tenants 140, 150 can be managed by a Tenant Management System (TMS) 138, through the CMS instance 132.

A single customer can have multiple tenants of a given type. By way of illustration, separate tenants can be instantiated and maintained for: development, test, quality assurance, pre-production, or production. The tenants can be hosted within a single landscape 130 or distributed among multiple landscapes 130, 160.

SAC tenant 140 can have an eXtended Services (XS) interface module 142 coupled to a database instance (DB) 144. DWC tenant can have a Database Services (DS) interface module 152 coupled to a database instance (DB) 154. In some examples, any of the DB instances 144, 154 can be SAP HANA database instances, however this is not a requirement, and other databases or a mix of database types can be used, in any combination. Particularly, XS module 142 can incorporate one or more providers for respective SAC content types, and DS module 152 can incorporate at least one provider for a DWC content type (e.g. for data tables).

Relevant to the present disclosure, tenants can receive or transmit software objects (e.g. analytic content objects) in furtherance of their mission. Accordingly, landscape 130 can also include a content store 134, which can serve as a repository of content objects (or, other software objects), and a central database 136, which can store or maintain metadata of the objects stored in repository 134. For example, a tenant 140 which generates analytic content can have such content stored in repository 134 for subsequent loading onto other tenants inside or outside landscape 130. Particularly, private or restricted content can be maintained within landscape 130, while public or preconfigured content can be maintained at central landscape 120 as described further herein. In some situations, repository 134 can be used by CMS 132 as a temporary store for content being exported from local tenant 140, 150, or being imported into local tenant 140, 150.

Cloud infrastructure 110 can also include a central landscape 120, which can serve as a repository for analytic content (or other software objects) to be managed or distributed within cloud infrastructure 110. That is, a producer of content (e.g. tenant 140, 150, or external source 170) can export content objects to the central landscape 120, or a consumer of content (e.g. tenant 140 or 150) can import content objects from the central landscape 120. Similar to landscape 130, the central landscape 120 has a CMS 122 coupled to one or more content stores 124, and a database 126 for associated metadata. The stores 124 can be organized according to classes of stored content. In some examples, public and restricted content can be stored in distinct stores 124. In other examples, current and archived (superseded) content can be stored in distinct stores 124. In further examples, analytic content, original database content, and other content can be stored in distinct stores 124. Although illustrated without any tenant, in some examples, landscape 120 can optionally include one or more tenants.

The features illustrated for landscapes 120, 130 are some representative features of interest in this disclosure. Each landscape and tenant can include numerous additional features including one or more of: a hypervisor, an operating system, a communication stack, storage, virtualization software, middleware, security software, a client interface, or other software modules. Additional landscapes 160 can have features generally similar to those of landscape 130. In some examples, additional landscapes similar to central landscape 120 can also be deployed. For example, two instances of central landscape 120 can serve distinct geographic regions, or one instance of central landscape 120 can be dedicated to a given customer, while another instance of central landscape 120 can be shared among other customers.

Cloud infrastructure 110 can also interact with external entities. For example, content can be sourced by external sources 170. Clients 180 can manage any component within cloud infrastructure 110. Particularly, a client 180 can direct loading of one or more software objects, or one or more packages of such objects, onto a tenant 140, 150. Clients 180 can also manage external sources 170.

First Example Method

Figure 2:
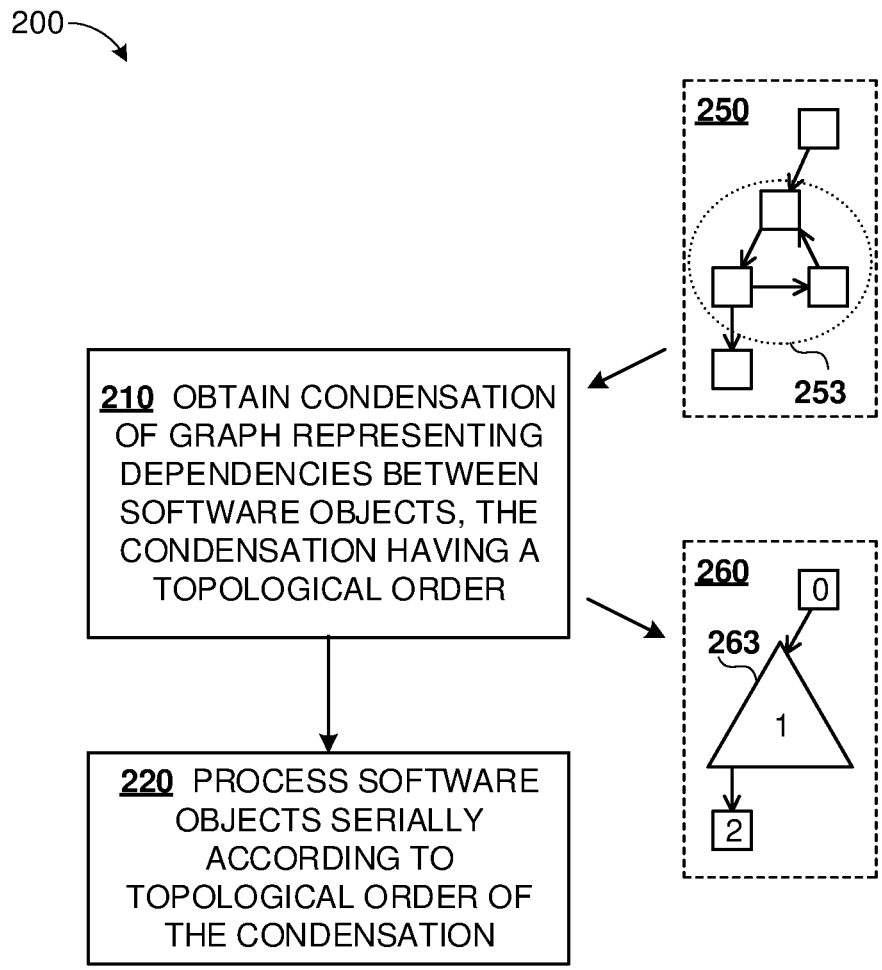
FIG. 2 is a flowchart of a first example method for serially processing software objects according to the disclosed technologies.

FIG. 2 is a flowchart 200 of a first example method for serially processing software objects according to the disclosed technologies. In this method, the order of serial processing can be determined based on a graph representing dependencies between the software objects.

At process block 210, a condensation of the graph can be obtained. The condensation can have a topological order. An illustrative graph 250 is shown in dashed outline. Respective software objects are represented by nodes shown as open squares, and each open arrow indicates a dependency between a corresponding pair of nodes. The square at the top of graph 250 is not dependent on any of the other squares, but is a prerequisite (directly or indirectly) for all the other squares. The square at the bottom of graph 250 is (directly or indirectly) dependent on all the other squares, and is not a prerequisite for any of the other squares. The three squares in between have cyclic dependencies and constitute a strongly connected component 253 as shown by dotted outline. Also shown is graph 260, which is a condensation of graph 250. Strongly connected component 253 has been replaced by contracted node 263 (depicted as a triangle), while the top and bottom squares have been retained intact. Particularly, condensation 260 is a directed acyclic graph, for which a topological order can be determined. As illustrated, the nodes of condensation 260 are labeled 0, 1, 2 to indicate the topological order.

At process block 220, the software objects can be serially processed according to the topological order of the condensation 260. In the illustrated example, the software object represented by the top square of condensation 260 can be processed first, in accordance with its position 0. Then, the software objects represented by contracted node 263 (i.e. the software objects represented by strongly connected nodes 253) can be processed sequentially, all at position 1. That is, contracted node 263 can represented the same objects as the original nodes 253, which can all inherit the topological order position of contracted node 263. Finally, the software object represented by the bottom square of condensation 260 can be processed, in accordance with its position 2. In this example, the objects corresponding to contracted node 260 can be processed serially before proceeding to any positions that are later in the topological order than the contracted node.

As illustrated, processing objects in serial order can mean that if object oB associated with node B is dependent on object oA associated with node A, then node B can have a later position in the topological order than node A. In an alternate scenario, nodes A and B can be part of a common strongly connected component, and can share a common position in the topological order, being the same position assigned to the strongly connected component containing nodes A and B.

Numerous extensions and variations of this method can be implemented. In some disclosed examples, processing the software objects can include loading the software objects, such as importing the software objects onto a tenant of a cloud infrastructure. As described further herein, loading can be performed as one or more pull operations, each pull operation initiated by a corresponding request from a target on which the software objects are to be loaded. Alternatively, loading can be performed as one or more push operations, under control of a controller external to the target, such as CMS 132.

In additional examples, the method can extend to receiving a request to process a group or package of software objects. Responsive to such request, the graph 250 with its nodes and directed edges can be built, and any strongly connected components can be identified. Subsequent to obtaining the condensation 260 of the graph 250, the topological order of the condensation can be determined.

In further examples, the method can extend to validating dependencies among the software objects, either concurrently with or subsequent to the serial processing (e.g. serial loading). Validating dependencies among the objects represented by a strongly connected component can be deferred until all of said represented objects have been processed. However, these objects represented by a strongly connected component can be validated before subsequent software objects have completed processing.

The software objects can include analytic content objects, which can be hosted or accessed from a cloud-hosted infrastructure such as 110. The software objects can include one or more stories, models, dimensions, connections, or value-driver trees. Alternatively or additionally, the software objects can include database objects (e.g. tables or views) or executable software modules.

Although the illustrated graph 253 has one strongly connected component, this is not a requirement. The disclosed technologies can be applied to graphs having two or more strongly connected components, such components being disjoint. The disclosed technologies can also be applied seamlessly to graphs lacking any strongly connected components, in which case a search for strongly connected components determines that there are none, that the given graph is already a directed acyclic graph, and its topological order can be used to serially load the associated software objects.

Example Dependencies

Figure 3A:
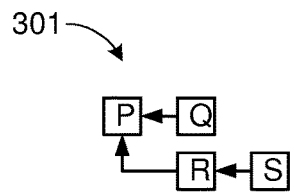
FIGS. 3A-3B are example graphs depicting dependencies among a set of objects.
Figure 3B:
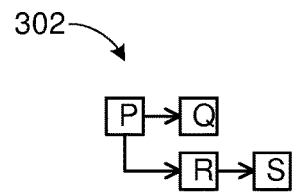

FIGS. 3A-3B are example graphs 301, 302 depicting dependencies among a set of objects in different ways. Nodes P, Q, R, S can represent software objects oP, oQ, oR, oS respectively. In FIG. 3A, dependencies between objects oP, oQ, oR, oS are illustrated with closed-head arrows pointing from a dependent object to its prerequisite, thus R ➔ P denotes that oR is dependent on oP. In FIG. 3B, the same dependencies between the same objects oP, oQ, oR, oS are illustrated with open-headed arrows pointing from a prerequisite to its dependent object, thus PR denotes that oP is a prerequisite of oR, which is the same dependency as R ➔ P.

In some examples, dependencies among software objects can be input in a data structure corresponding to the representation of graph 301, and an initial graph processing operation can be inversion or transposition of the graph to derive a data structure corresponding to the representation of graph 302. In other examples, disclosed technologies can be implemented in terms of the representation of graph 301, and the software objects can be processed backwards according to the topological order, i.e. an object with no dependencies in last place in the topological order, but processed first, just as described above.

Illustrative Graph Processing Example

Figure 4A:
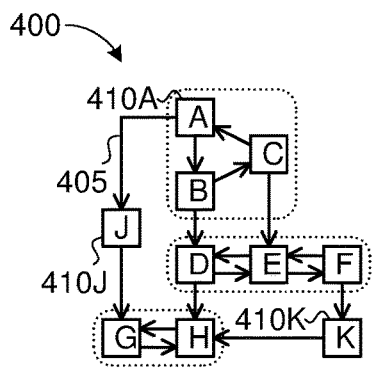
FIGS. 4A-4D are diagrams depicting an example application of disclosed technologies to a set of objects.
Figure 4B:
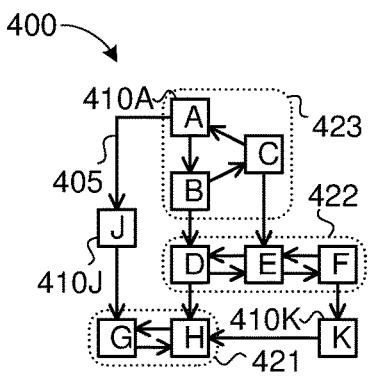
Figure 4C:
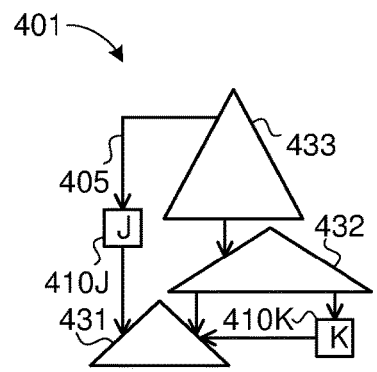

FIGS. 4A-4D are diagrams depicting an example application of disclosed technologies to a set of objects. FIG. 4A depicts a directed graph 400 having nodes A-K (e.g. 410A, 410J, 410K) representing corresponding software objects oA-oK. The dependencies among these nodes 410A-410K are the directed edges 405 shown as open-ended arrows. FIG. 4B depicts the same graph 400, following identification of strongly connected components 421-423. Each strongly connected component 421-423 can be replaced with a corresponding contracted node 431-433 to obtain the condensation 401 of graph 400, which is a DAG, as shown in FIG. 4C. Nodes J, K are not part of any strongly connected component and are retained in condensation 401. It can be seen that although graph 400 had two dependencies of component 423 on component 422, the condensation merges these two dependencies into a single dependency indicating that contracted node 433 is a prerequisite of contracted node 432.

Figure 4D:
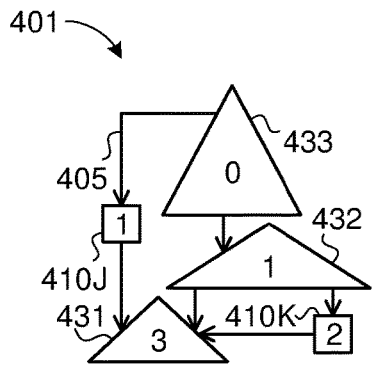

Turning to FIG. 4D, graph 401 is shown after assigning topological ordering to the nodes. Contracted node 433 is the only node having no prerequisites and is assigned a number 0. The remaining nodes are assigned positions greater than any node on which they depend. Thus, nodes J and 432 only depend on contracted node 433, and can be assigned position 1, and node K can be assigned position 2. Contracted node 431 is dependent on nodes having positions 1 or 2, and can be assigned position 3. In this example, the objects corresponding to node J and node 432 can be processed serially in either order while respecting dependencies with the remaining nodes, and accordingly node J and node 433 can be assigned a degenerate (shared) position in the topological order. In other examples, a strict topological ordering can be used (i.e. no repeats), and node J and node 432 can be assigned positions 1, 2 in either order, with nodes K, 431 assigned positions 3, 4 respectively.

Example Serial Manifest

Figure 5:
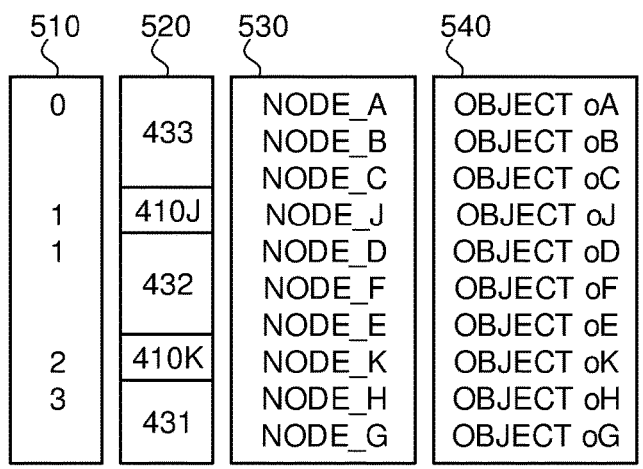
FIG. 5 is a diagram depicting construction of a serial manifest for the example of FIGS. DA-DD, according to the disclosed technologies.

FIG. 5 is a diagram 500 depicting construction of a serial manifest for the example of FIGS. 4A-4D. Structure 510, shown only for clarity of illustration, is an enumeration of the topological positions of the nodes of condensation graph 401. Structure 520 lists the nodes of condensation graph 401 according to this order. Node 410J is shown arbitrarily as preceding node 432. Equivalently, node 432 could precede node 410J at position 1. In structure 530, the contracted nodes of structure 520 have been expanded to list the corresponding nodes from graph 400. The ordering within a given strongly connected component can be immaterial: in some examples, nodes A, B, C could equivalently have been listed as B, C, A. Finally, structure 540 lists the software objects oA-oK represented by nodes A-K in matching order.

In some examples, a serial manifest can be simply a structure similar to structure 540, providing a serial listing of the software objects or their corresponding identifiers. In other examples, a serial manifest can include additional metadata. The metadata can indicate a type of an object, a source of an object, a repository in which a software object is stored, a filesize, a checksum, a version, or another attribute.

Second Example Method

Figure 6:
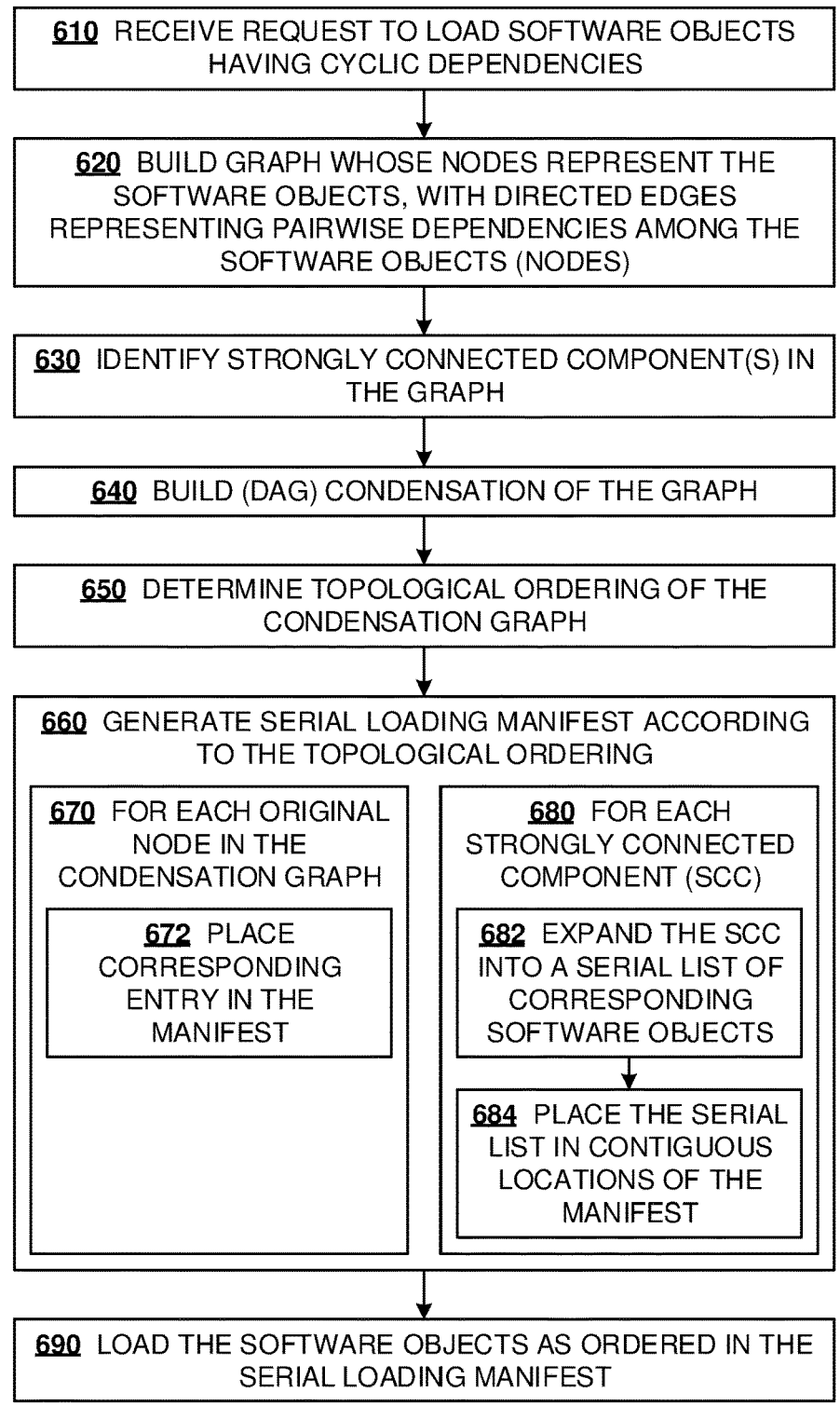
FIG. 6 is a flowchart of a second example method for serially loading software objects according to the disclosed technologies.

FIG. 6 is a flowchart 600 of a second example method for serially loading software objects according to the disclosed technologies. In this method, software objects having one or more cyclic dependencies can be serialized and loaded in a reproducible order.

At process block 610, a request can be received, to load specified software objects. The request can designate a package comprising the objects, or can enumerate the objects individually. The package or the individual objects can have metadata indicating the dependencies among the objects. At process block 620, a graph can be built, the nodes of the graph representing the software objects, and directed edges of the graph representing pairwise dependencies among the software objects (or nodes). In varying examples, either convention can be used for the directed edges, namely "is dependent on" (➧) or "is a prerequisite of" (→), as described herein.

At process block 630, the strongly connected components, if any, in the graph can be identified, and at process block 640, a condensation of the graph can be built. Any of numerous procedures can be used for identifying strongly connected components, including known depth-first procedures such as the Dijkstra, Kosaraju, Sharir, or Tarjan procedures or parallelizable reachability-based procedures such as the Fleischer procedure. The condensation being a directed acyclic graph, at process block 650, a topological ordering of the condensation graph can be determined. The topological ordering can be determined, for example, by Tarjan or Kahn procedures, or parallelized derivatives thereof.

At process block 660, a serial loading manifest can be generated according to the topological ordering. The condensation graph can retain nodes of the original graph (i.e. representing a single software object, such as nodes J, K of graph 501). Any such nodes cane be handled, in their turn according to the topological order, at block 670. Within block 670, a corresponding entry can be placed in the manifest at process block 672. The condensation graph can also include one or more contracted nodes representing strongly connected components of the original graph (i.e. each collapsed node representing two or more software objects). Any such contracted nodes can be handled in their turn at block 680, according to the topological order. Within block 680, the strongly connected component associated with an instant contracted node can be expanded, at block 682, into a serial list of corresponding software objects. The serial list can be entered into contiguous locations of the serial manifest at block 684. The entries at blocks 672, 684 can immediately follow the last preceding entry, so that the serial manifest is filled in the same topological order as the nodes are processed.

After the serial loading manifest has been completed, the software objects can be loaded as ordered in the serial loading manifest, at process block 690. In some examples, the serial loading manifest can identify one or more repositories from which the software objects can be loaded.

Numerous extensions and variations of this method can be implemented. A destination (target) of the loading operation can be a tenant in a cloud infrastructure. Operations of the method can be performed by hardware processors in a content distribution network, which can be hosted in a computing cloud. Some or all of the receiving, building, identifying, forming, determining, or generating operations can be performed by a content management service. In some examples, the loading can also be performed by the content management services, as one or more push actions onto a target. In other examples, the method can include transmitting the serial loading manifest to the target, so that the target can control the loading operation using the serial manifest.

In further examples, each software object can be accompanied by a respective document identifying the software object in relation to the serial loading manifest. The document or the serial loading manifest can include information about cyclic dependencies pertaining to an instant software object, or can include flags or other indicators controlling validation of dependencies of one or more software objects. For example, a flag can indicate: that validation of an object within a strongly connected component can be deferred; that validation of an object can be performed immediately upon loading the object; or that a current object is the last object of a given strongly connected component to be loaded, so that dependencies of all software objects within the strongly connected component can be validated once the last object has been loaded.

Third Example Method

Figure 7:
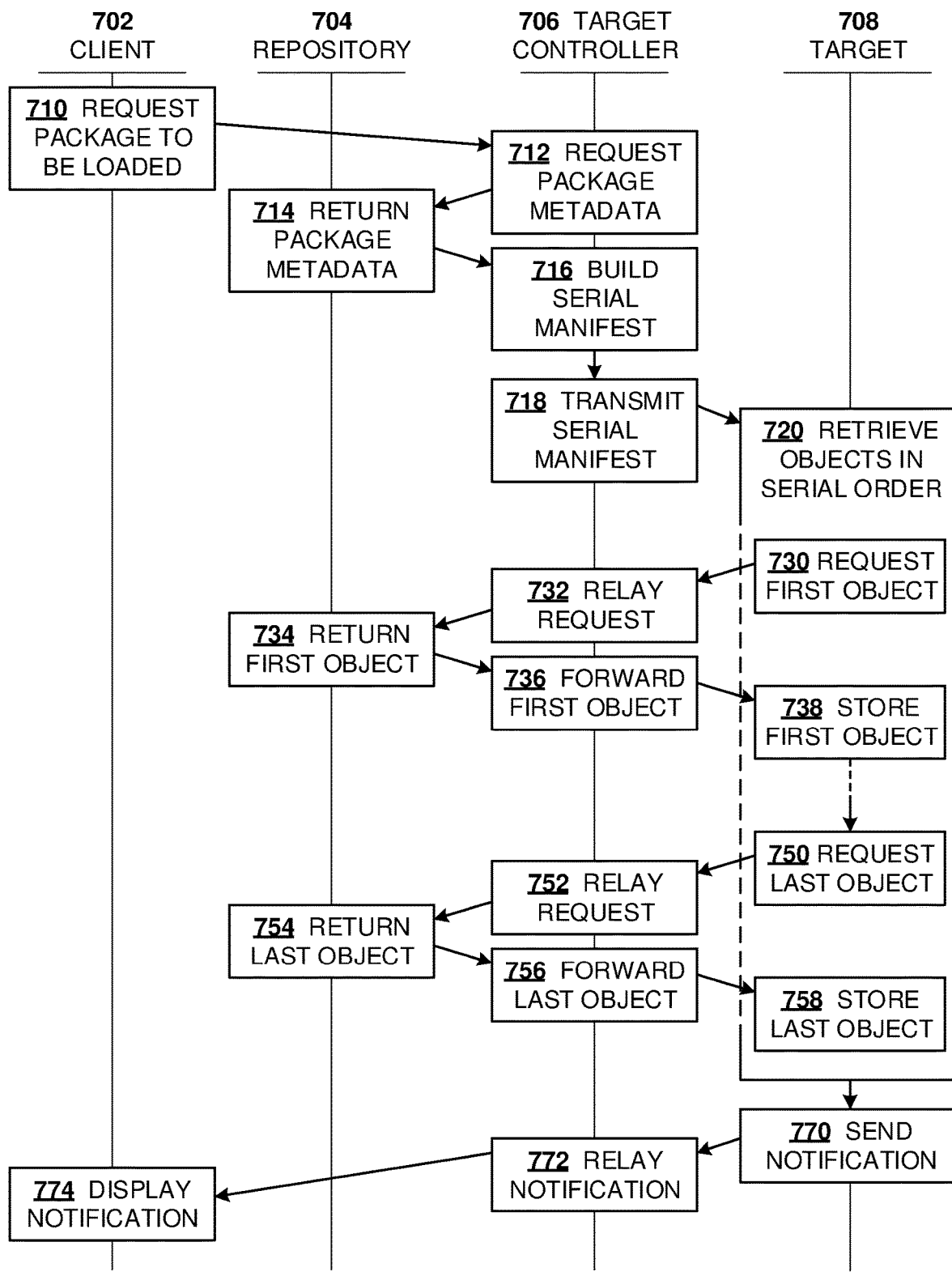
FIG. 7 is a flowchart of a third example method for serially loading software objects according to the disclosed technologies.

FIG. 7 is a flowchart 700 of a third example method for serially loading software objects onto a target. In this method, the software objects are pulled from a repository by requests from the target, using a serial loading manifest. For clarity of illustration, the process blocks of flowchart 700 are arranged in swim lanes according to actors which can perform respective actions. However, the illustrated assignment of actions to actors is exemplary and, in variations, a given action can be performed by a different actor, including an actor not explicitly depicted in flowchart 700. The depicted actors include client 702, which can be similar to client 180 of FIG. 1; repository 704, which can be similar to landscape 120 (or, more particularly, store 124 and database 126 of landscape 120); target controller 706, which can be similar to CMS instance 132; and target 708, which can be similar to tenant 140 or 150. Target controller 706 can be the controller of target 708, in some examples a central controller instance of a landscape within which target 708 is hosted.

At process block 710, client 702 can request that a package of software objects be loaded onto target 708. This first request can be delivered or forwarded to target controller 706, which can issue a second request for metadata of the package at block 712. This second request can be delivered or forwarded to repository 704, which in turn can return the package metadata to target controller 706 at process block 714. At block 716, target controller 706 can build a serial loading manifest for the instant package, as described herein. At block 718, the serial manifest can be transmitted to the target 708.

At block 720, target 708 can retrieve objects in the serial order specified in the serial loading manifest. Initially, the first object in the serial manifest (e.g. similar to object oA in FIG. 5) can be requested by target 708 at block 730. This request can be routed via target controller 706 (block 732) to repository 734, which can respond by returning the requested object at block 734. The object can be routed via target controller 706 (block 736) to target 708. At block 738, target 708 can receive and store the instant object. As described herein, loading can encompass storing the object, registering the object so it is visible or accessible within the tenant environment, or performing checks on the object.

Following retrieval and loading of the first object from the serial manifest, block 720 can continue to retrieve and load the second object, third object, and so on, in the order specified in the serial manifest. The operations for loading each successive object can be generally similar to blocks 730-738 described for the first object. Eventually, the last object in the serial loading manifest is reached, and can be retrieved and stored by process blocks 750-758 which, as illustrated, are substantially similar to blocks 730-738 described above.

In some examples, upon completion of block 720, the method can proceed to block 770, where target 708 can issue a notification indicating that loading is complete. The notification can be relayed at block 772 to client 702, which can log or display the notification at block 774.

Numerous extensions and variations of this method can be implemented. In some examples, controller 706 can attach a JSON document to a software object while forwarding the software object e.g. at block 736, 756. The forwarding operations at blocks 736, 756 can be directed to a provider for the software object at the target 708. The provider can make a determination, based on the attached JSON document, whether the instant software object can be validated, and can validate any dependencies of the instant software object accordingly. For example, a software object having no dependencies, a software object having all dependencies already loaded, or a software object which is the last among a strongly connected component to be loaded, can have its dependencies validated. Conversely, a non-final software object within a strongly connected component can have its dependency validation deferred.

As illustrated, the loading of successive objects can be non-overlapping, so that loading the $M^{th}$ object completes before a request for object M+1 is requested. However, this is not a requirement, and in some instances loading of distinct software objects can be pipelined, can overlap, or can be performed concurrently. Particularly, software objects of a common strongly connected component or software objects having a same position within a topological ordering (e.g. all nodes numbered 1 in FIG. 4D) can be loaded with at least some concurrency. Further, graphs can have independent branches. With reference to FIG. 3B, a topological ordering can assign nodes P, Q, R, S to positions 0, 1, 1, 2 respectively. The objects represented by nodes Q and R can be loaded concurrently at least because they have a same position in the topological ordering. Inasmuch as branch RS is independent of branch Q, node S (with position 2) can also be loaded before the loading of node Q completes. That is, the serial ordering of a branch such as RS can be adhered to independently of serial ordering of other branches of a graph. Exploitable parallelism in loading can be indicated in a serial loading manifest.

In some examples, target controller 732 can query a name resolution service or a directory to identify repository 704 storing the package requested at block 710, so that the request of block 712 can be directed to the correct repository 704.

A single repository 704 has been illustrated in FIG. 7, however this is not a requirement. In other examples, a package can include dependencies on software objects stored separately from other objects of the package. To illustrate, multiple packages can rely on common database objects (e.g. tables, views) which in some instances can be quite large (e.g. up to multiple terabytes). For efficient storage and maintenance, a cloud infrastructure can store just one copy of such common objects, or fewer copies of such objects than the number of packages referencing these objects. In such cases, objects can be retrieved at block 720 from multiple repositories 704.

Still further, repository 704 can be located within a central landscape (similar to landscape 120) or within a local landscape. As an illustration of the latter scenario, SAC tenant 140 can load one or more private content objects sourced by DWC tenant 150. These objects can be stored by, and retrieved from, local landscape store 134, with associated metadata served from landscape database 136, in the local landscape 130.

Fourth Example Method

Figure 8:
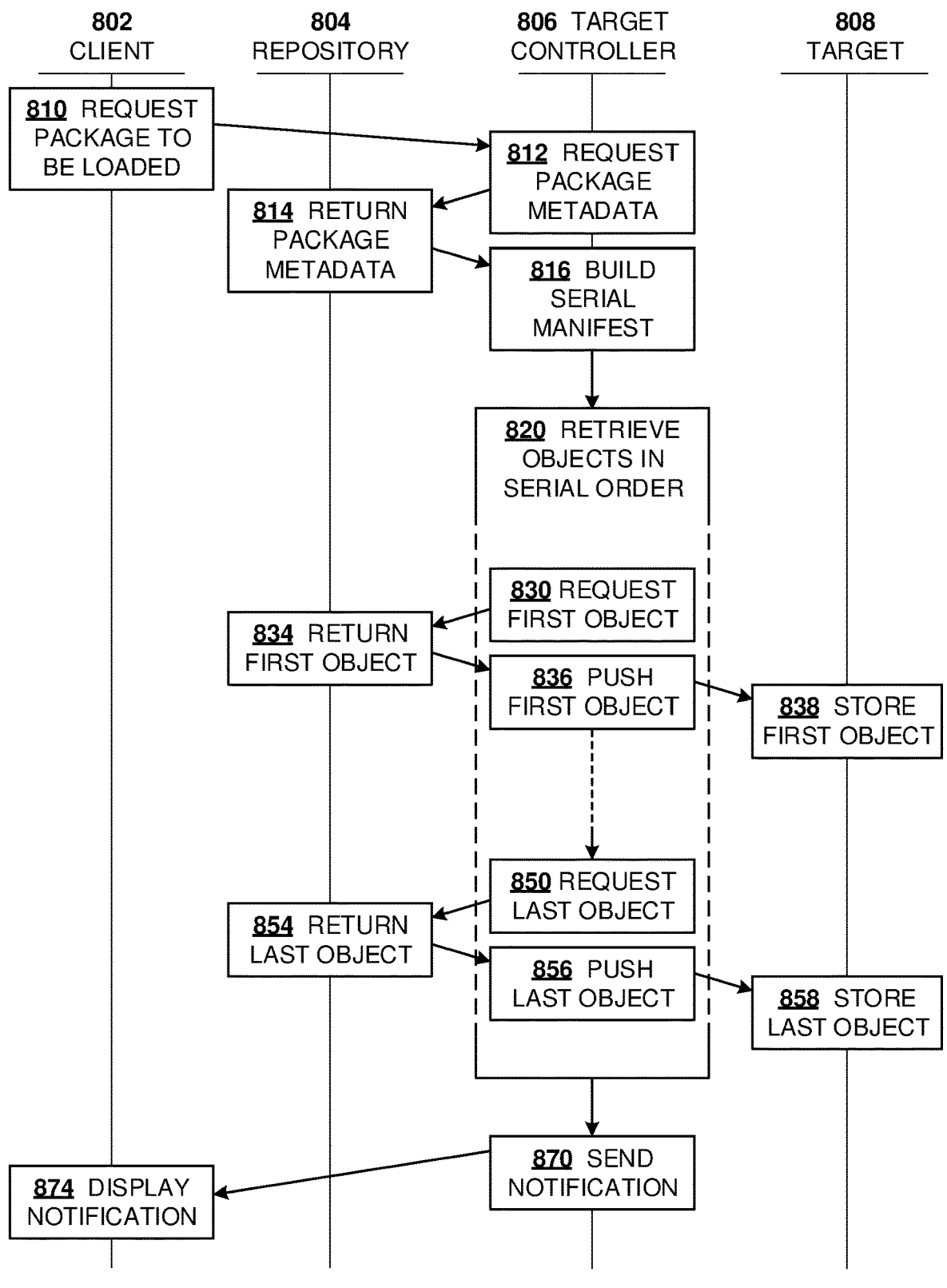
FIG. 8 is a flowchart of a fourth example method for serially loading software objects according to the disclosed technologies.

FIG. 8 is a flowchart 800 of a fourth example method for serially loading software objects onto a target. In this method, the software objects are retrieved from a repository by requests initiated by a target controller, using a serial loading manifest, and pushed to a target. As with FIG. 7, the process blocks of flowchart 700 are arranged in swim lanes for clarity of illustration, but the illustrated assignment of actions to actors is exemplary, and a given action could be performed by a different actor, including an actor not explicitly depicted in flowchart 800. One or more of the depicted actors (client 802, repository 804, target controller 806, or target 808) can be similar to corresponding entities depicted in FIG. 1.

Process blocks 810 (a client request to load a package), through block 816 (building a serial manifest), can be generally similar to the corresponding process blocks of FIG. 7, and are not described in detail. However, block 820, retrieving objects in serial order, can be performed by target controller 806, in distinction from block 720. Thus, the first object from the serial manifest can be requested by controller 806 at block 830. In response to this request, repository 804 can return the requested object at block 834. Upon receipt of the object, controller 806 can push the object to target 808 at block 836. Similar to block 738, target 808 can store the received object at block 838. After the first block, successive software objects can be requested, pushed, and stored in similar fashion, according to the order specified in the serial manifest. Eventually, process blocks 850, 854, 856, 858 can cause the last object to be loaded onto target 808, in a similar manner described above for blocks 830, 834, 836, 838. After loading is complete, controller 806 can send a notification at block 870 to requesting client 802, which can display or log the notification at process block 874. In some examples, the notification can be issued upon determination that any validations have been successfully completed.

Similar to the method of FIG. 7, numerous extensions and variations of this method can also be implemented. A provider within target 808 can perform validation in conjunction with blocks 838, 858 as discussed herein.

Fifth Example Method

Figure 9:
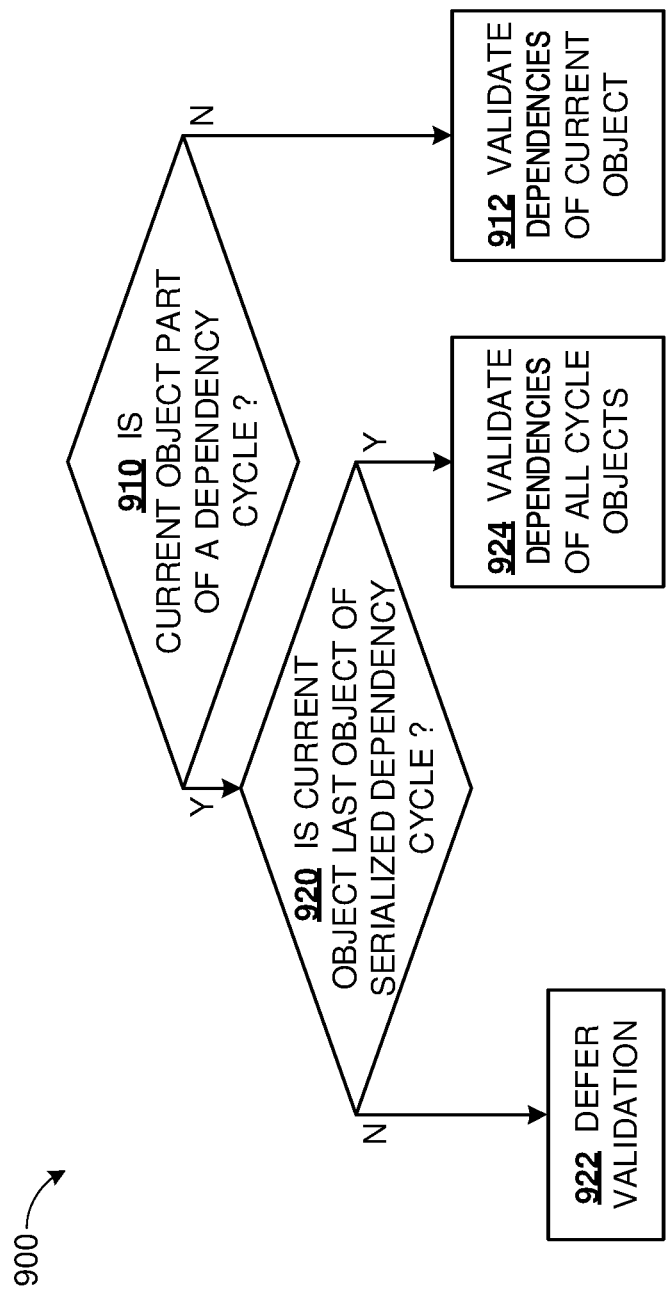
FIG. 9 is a flowchart of a fifth example method for validation of dependencies of a software object, according to the disclosed technologies.

FIG. 9 is a flowchart 900 of a fifth example method for validation of dependencies of a software object. In some examples, this method can be performed at a provider within a target on which the software object is being processed or loaded, however this is not a requirement. In varying examples, this method can be performed at a repository hosting or managing metadata of the loaded software objects, or at a controller (e.g. an instance of a central management service).

At decision block 910, a determination can be made as to whether a current software object is part of a dependency cycle (i.e. part of a strongly connected component). If the determination is negative (e.g. objects of or oK of FIG. 5), then the method can follow the N branch from block 910 to process block 912, where dependencies of the current object can be validated.

However, if the determination at block 910 is affirmative (e.g. objects oD, oE, or oF of FIG. 5), then the method can follow the Y branch from block 910 to further decision block 920. At block 920, a determination can be made whether the current object is the last object in the serialization of the instant strongly connected component. If this determination is negative (e.g. objects oD or oF of FIG. 5), then the method can follow the N branch from block 920 to process block 922, where the validation of dependencies of the instant object can be deferred, as the instant object could have a dependency on another object of the instant strongly connected component which has not been loaded yet. However, if the determination at block 920 is affirmative (e.g. object oE of FIG. 5), then the method can follow the Y branch from block 920 to process block 924. At block 924, dependencies of all objects of the instant strongly connected component can be validated, because all these objects (e.g. objects oD, oE, oF of FIG. 5) and all of their prerequisites (e.g. objects oA, oB, oC) have already been loaded.

Numerous extensions and variations of this method can be implemented. For example, following flowchart 900 with reference to strongly connected component 423 of FIG. DB ordered as in FIG. 5, validation of dependencies could be deferred for objects oA, oB, because object oC has not been loaded, and dependencies of all objects oA, oB, oC, could be performed at block 924 after loading of object oC. However, in other examples, validation of object oB can be performed directly upon loading of oB, since its only prerequisite (object oA) has already been loaded. That is, in some cycles, it may not be required to defer validation of all-except-the-last object according to block 922, if the immediate predecessors of a given object have already been loaded. This can be advantageous in situations where not all entities involved in validation have the capability to defer validation. To illustrate, if the entity validating object oC can defer validation but the entities validating objects oA, oB cannot, then nodes A, B, C can be serialized in the order C, A, B, so that only validation of object oC can be deferred. Object oA can be validated upon its loading, because its prerequisite oC has been previously loaded. Object oB can be validated upon its loading, because all objects belonging to strongly connected component 423 have been loaded. Thus, in some examples, the serialization within a strongly connected component can be chosen to improve efficiency of the validation process, and variations of flowchart 900 can be used. For example, validation can be controlled according to flags set within a serial loading manifest to indicate precisely which validations can be deferred.

Composite Example Document

FIG. 10 depicts a composite example document 1000 suitable for use with the disclosed technologies. For purpose of illustration, document 1000 includes some data, a serial manifest, and some metadata of an example package load. In varying examples, the contents of document 1000 could be distributed among multiple documents, some portions of document 1000 could be omitted or communicated in a different way, or additional content could be included, without limitation. Document 1000 is shown in a JSON format, however other formats can be used. Document 1000 corresponds to a mixed load, in which some software objects are loaded onto a DWC tenant while other software objects are loaded onto an SAC tenant. Other examples can load software objects onto a single tenant. A document similar to document 1000 can be assembled e.g. at blocks 736, 756 of FIG. 7 or blocks 836, 856 of FIG. 8 and transmitted to a corresponding target, including or alongside associated content.

Beginning at the top of document 1000, a totalChunks field can indicate a number of chunks in an instant object, namely five in the illustrated example, and a targetResourceId field indicates an identifier (unique within a cloud infrastructure) of the target to which the object or package will be loaded. An importOptions field indicates flags to control the loading workflow. To illustrate, UPDATE_ALL indicates that metadata and data of the object are to be updated if newer versions are available in a repository. Other values can indicate that only new objects are to be loaded, while objects already present on the target need not be re-loaded or overwritten. A parameters field can specify additional parameters. In the illustration, includeData having a value True indicates that data (e.g. one chunk) of the instant object is included within document 1000, while includeAuditData having a value False indicates that audit data (e.g. a pointer to an audit record for the instant object, or a checksum) is not included. Thus, various parameters associated with the load can be provided as respective fields within document 1000 (e.g. importOptions field) or as a list of parameters (the parameters list). In other examples, bit field combinations can be used to specify multiple Boolean flags in a single control parameter. A sessionId field can be used to maintain association between various requests and responses involved in loading an instant package to an instant tenant.

The selection [ ] array lists entries for each object being loaded. The depicted entries and objects correspond to those of FIGS. 4-5. The selection [ ] array can itself serve as a serial loading manifest, or can be derived from a serial loading manifest. Entries (bracketed { }) are listed for each object of the instant package, with one entry (record) for each object, and a triplet of fields for each object. An id field identifies an object (e.g. oA), a provider field indicates a provider supporting the instant software object (e.g. DS:Prov indicating a provider within a DWC tenant; or XS:Prov1, Prov2 indicating respective providers within an SAC tenant), and a type field indicates a content type of the instant object (e.g. localTable, being a database table stored in the data warehouse cloud (DWC)). The illustrated selection [ ] array corresponds to a load operation in which objects oK, oG are to be loaded onto an SAC tenant, while the remaining objects are to be loaded onto a DWC tenant.

Following the selection [ ] array, a selectedIndex field identifies the instant object associated with document 1000, among the listed objects in the selection [ ] array. To illustrate, a value 6 identifies object oE (counting the first object oA as value 0). A cycle field lists the cycle (strongly connected components) of which the current object oE is a part. That is, cycle [4, 5, 6] indicates objects oD, oE, of (component 422). Finally, in accordance with the include-Data parameter being True, a content field provides content of at least one chunk of the instant object. Binary content in a JSON document can be encoded using any of numerous available standards including, without limitation, base64 or yEnc. Other document alternatives can include multipart forms to separate binary content from metadata fields, or a binary JSON equivalent such as smile. An identifier of an instant chunk can be included within a protocol header associated with the transmission of the software object, and can be omitted from document 1000.

Additional Example Features

1. Level Sort

A particular partial topological order used in some disclosed examples is dubbed a "level sort" and is described with reference to FIG. 3B. Initially, all nodes having no prerequisites are assigned to level 0, or simply a serial position of zero. Thus, node P is assigned to level 0. Then, at each successive level (1, 2, 3 . . . ), those among remaining nodes whose prerequisites have all been assigned are collected and are each assigned to the current level. In FIG. 3B, at level 1, nodes Q, R have had their prerequisites (node P) assigned, and can be set to level 1. Then, at level 2, the prerequisites of node S are determined to be already assigned, so S can be set to level 2. Thus, the assigned ordering is: P=0, Q=R=1, S=2. Mathematically, this level sort can be described as: set level=0 for nodes having no prerequisite, and level(K)=max({level(prerequisite(K))})+1 for other nodes K. That is, collect the set of levels for each prerequisite of K, take the maximum of that set, and add 1. The choice of zero as a starting level is arbitrary. Furthermore, if there are multiple nodes having no prerequisite, a valid topological ordering can be obtained using different starting values for each such node.

2. Alternative Implementations

A partial topological order can be built in the reverse direction using a similar procedure. Nodes Q, S, having no dependents, can be assigned level 4 (an arbitrary choice, set here to the total number of nodes). Then at an immediately preceding level 3, node R can be assigned because its sole dependent S has already been assigned. However, node P cannot be assigned, because its dependent node R has not yet been assigned. So, node R can be set to level 3. At the next preceding level 2, node P can now be assigned. Thus, the assigned ordering is P=2, R=3, Q=S=4. Mathematically, this level sort can be described as: set level=Constant for nodes having no dependents, and set level(K)=min({level(dependent(K))})−1 for other nodes.

Another topological order can be built as follows. Nodes Q, S having no dependents can be arbitrarily assigned to levels 5 and 3 respectively. Then, assign R=4, as one more than its dependent (S), and P=6 as one more than the maximum of its dependents (Q=5, R=4). Thus, the assigned ordering is S=3, R=4, Q=5, P=6. To get prerequisite nodes loaded before dependent nodes, the topological ordering can be followed in descending direction: P, Q, R, S. That is a topological ordering can be followed in either ascending order or descending order (but not mixed) within the meaning of "according to the topological order" and similar expressions used herein.

A Generalized Computer Environment

Figure 11:
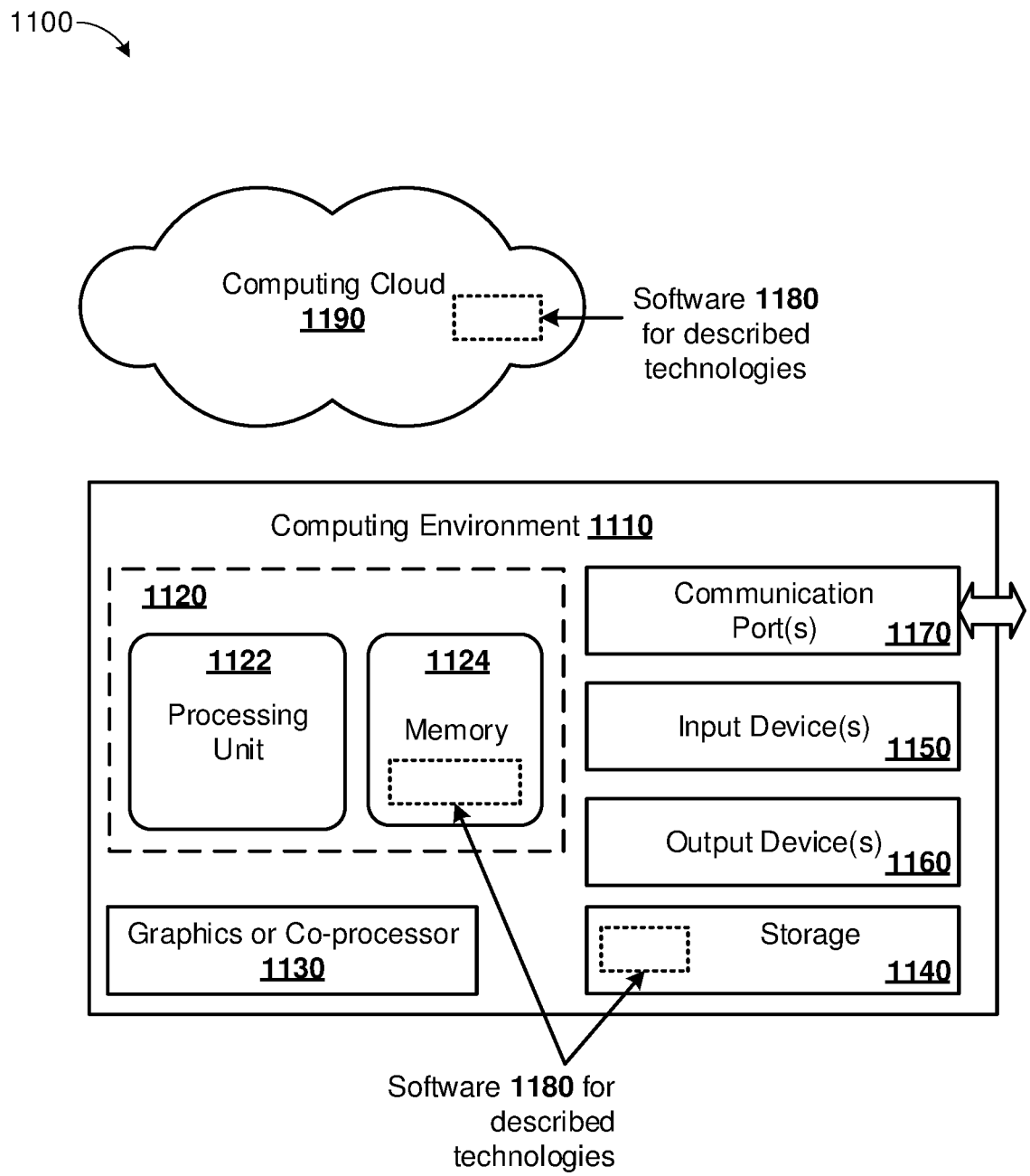
FIG. 11 is a diagram schematically depicting a computing environment suitable for implementation of disclosed technologies.

FIG. 11 illustrates a generalized example of a suitable computing system 1100 in which described examples, techniques, and technologies, including construction, deployment, operation, and maintenance of software for serialization, processing, or loading of software objects, including software objects or packages having cyclic dependencies, can be implemented according to disclosed technologies. The computing system 1100 is not intended to suggest any limitation as to scope of use or functionality of the present disclosure, as the innovations can be implemented in diverse general-purpose or special-purpose computing systems.

With reference to FIG. 11, computing environment 1110 includes one or more processing units 1122 and memory 1124. In FIG. 11, this basic configuration 1120 is included within a dashed line. Processing unit 1122 executes computer-executable instructions, such as for implementing any of the methods or objects described herein for building a serial manifest, processing software objects, loading software objects, or validating dependencies, or various other architectures, software components, handlers, managers, modules, or services described herein. Processing unit 1122 can be a general-purpose central processing unit (CPU), a processor in an application-specific integrated circuit (ASIC), or any other type of processor. In a multi-processing system, multiple processing units execute computer-executable instructions to increase processing power. Computing environment 1110 can also include a graphics processing unit or co-processing unit 1130. Tangible memory 1124 can be volatile memory (e.g., registers, cache, or RAM), non-volatile memory (e.g., ROM, EEPROM, or flash memory), or some combination thereof, accessible by processing units 1122, 1130. The memory 1124 stores software 1180 implementing one or more innovations described herein, in the form of computer-executable instructions suitable for execution by the processing unit(s) 1122, 1130. The memory 1124 can also store content objects; dependency graphs; package metadata; routing tables; content directories; authorization tables; data structures for managing tenants, loading, importing, exporting, storing, or validating software objects including analytical content objects; other configuration data, data structures including data tables, working tables, change logs, output structures, data values, indices, or flags, as well as other operational data.

A computing system 1110 can have additional features, such as one or more of storage 1140, input devices 1150, output devices 1160, or communication ports 1170. An interconnection mechanism (not shown) such as a bus, controller, or network interconnects the hardware components of the computing environment 1110. Typically, operating system software (not shown) provides an operating environment for other software executing in the computing environment 1110, and coordinates activities of the hardware and software components of the computing environment 1110.

The tangible storage 1140 can be removable or non-removable, and includes magnetic disks, magnetic tapes or cassettes, CD-ROMs, DVDs, or any other medium which can be used to store information in a non-transitory way and which can be accessed within the computing environment 1110. The storage 1140 stores instructions of the software 1180 (including instructions and/or data) implementing one or more innovations described herein.

The input device(s) 1150 can be a mechanical, touch-sensing, or proximity-sensing input device such as a keyboard, mouse, pen, touchscreen, trackball, a voice input device, a scanning device, or another device that provides input to the computing environment 1110. The output device(s) 1160 can be a display, printer, speaker, optical disk writer, or another device that provides output from the computing environment 1110.

The communication port(s) 1170 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1100 can also include a computing cloud 1190 in which instructions implementing all or a portion of the disclosed technologies are executed. Any combination of memory 1124, storage 1140, and computing cloud 1190 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 12:
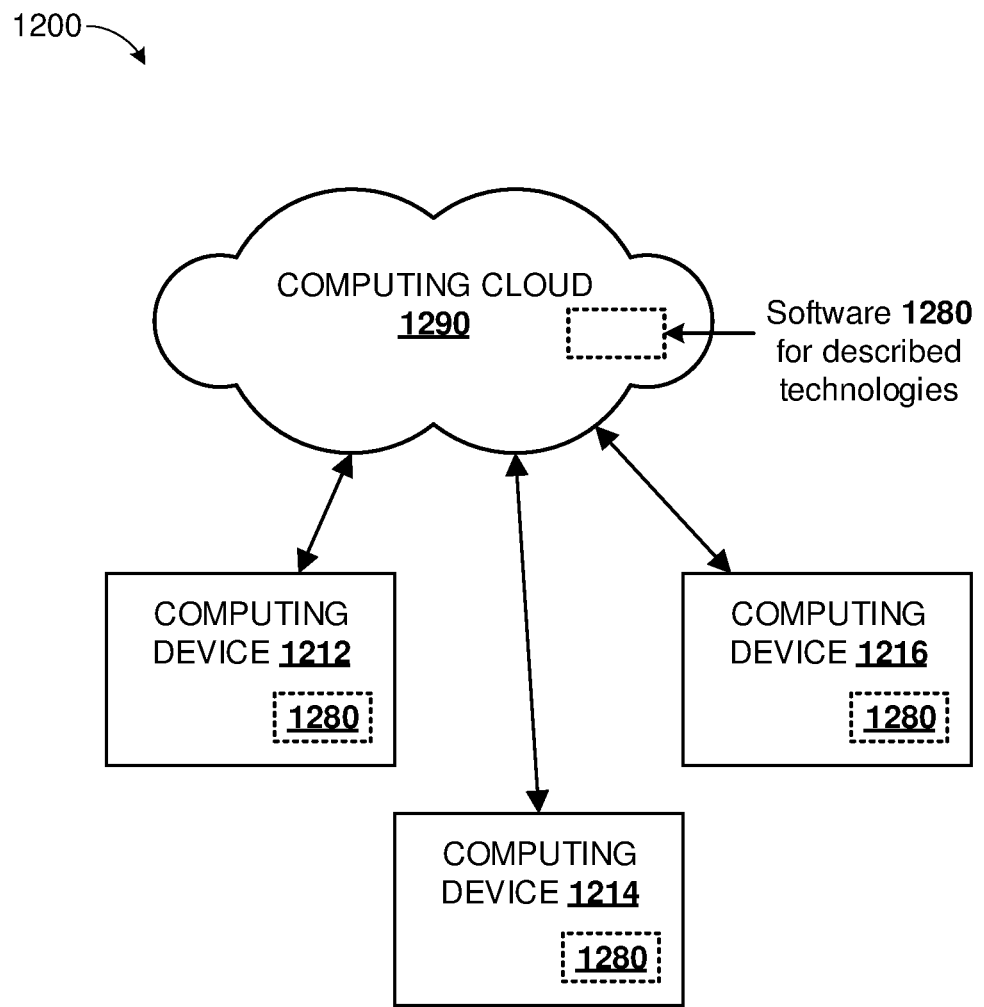
FIG. 12 is a diagram schematically depicting computing devices operating in conjunction with a computing cloud for implementation of disclosed technologies.

FIG. 12 depicts an example cloud computing environment 1200 in which the described technologies can be implemented. The cloud computing environment 1200 comprises a computing cloud 1290 containing resources and providing services. The computing cloud 1290 can comprise various types of cloud computing resources, such as computer servers, data storage repositories, networking resources, and so forth. The computing cloud 1290 can be centrally located (e.g., provided by a data center of a business or organization) or distributed (e.g., provided by various computing resources located at different locations, such as different data centers and/or located in different cities or countries).

The computing cloud 1290 can be operatively connected to various types of computing devices (e.g., client computing devices), such as computing devices 1212, 1214, and 1216, and can provide a range of computing services thereto. One or more of computing devices 1212, 1214, and 1216 can be computers (e.g., servers, virtual machines, embedded systems, desktop, or laptop computers), mobile devices (e.g., tablet computers, smartphones, or wearable appliances), or other types of computing devices. Communication links between computing cloud 1290 and computing devices 1212, 1214, and 1216 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1212, 1214, and 1216 can also be connected to each other.

Computing devices 1212, 1214, and 1216 can utilize the computing cloud 1290 to obtain computing services and perform computing operations (e.g., data processing, data storage, and the like). Particularly, software 1280 for performing the described innovative technologies can be resident or executed in the computing cloud 1290, in computing devices 1212, 1214, and 1216, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "apply," "authenticate," "build," "call," "check," "combine," "compute," "configure," "connect," "contract," "control," "defer," "determine," "display," "evaluate," "execute," "expand," "form," "forward," "generate," "identify," "indicate," "load," "link," "merge," "notify," "obtain," "output," "perform," "place," "process," "provide," "reach," "receive," "relay," "request," "respond," "return," "retrieve," "select," "send," "serve," "set," "store," "test," "transmit," "update," "use," or "validate" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1124, and storage 1140. The terms computer-readable media or computer-readable storage media do not include signals and carrier waves. In addition, the terms computer-readable media or computer-readable storage media do not include communication ports (e.g., 1170) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C#, Curl, Dart, Fortran, Go, Java, JavaScript, *Julia*, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computer, hardware, and communication technologies are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of serially processing a plurality of software objects having one or more cyclic dependencies, the method comprising:

for a graph of nodes and directed edges respectively representing the software objects and pairwise dependencies therebetween, the directed edges collectively further representing the one or more cyclic dependencies, obtaining a condensation of the graph having a topological order;

wherein the condensation comprises a contracted node representing a strongly connected component of the graph, wherein the strongly connected component comprises a plurality of the nodes having, for each pair of distinct first and second nodes among the plurality of nodes, a first path leading from the first node to the second node and a second path leading from the second node to the first node, the first and second paths being along respective edges among the directed edges, wherein the contracted node represents the plurality of nodes of the strongly connected component and further represents corresponding objects among the software objects; and loading the software objects serially according to the topological order.

2. The method of claim 1, wherein the contracted node has a given position in the topological order; and wherein the processing, upon reaching the given position, processes the corresponding objects serially before proceeding to any positions in the topological order subsequent to the given position.

3. The method of claim 1, wherein third and fourth nodes of the nodes represent first and second objects of the software objects respectively, the second object is dependent on the first object, and the fourth node has a later position in the topological order than the third node.

4. The method of claim 1, further comprising validating dependencies of the loaded software objects.

5. The method of claim 4, wherein the validating dependencies among the corresponding objects is deferred until all the corresponding objects have been loaded.

6. The method of claim 4, wherein the validating dependencies among the corresponding objects is performed prior to completion of the loading of the software objects.

7. The method of claim 1, wherein the software objects comprise one or more stories, models, dimensions, connections, or value-driver trees.

8. The method of claim 1, wherein the software objects comprise one or more database objects.

9. The method of claim 1, wherein the strongly connected component is a first strongly connected component, the contracted node is a first contracted node, and wherein the condensation of the graph further comprises a second contracted node representing a second strongly connected component of the graph, the first and second strongly connected components being disjoint.

10. One or more non-transitory computer-readable media storing instructions which, when executed by one or more hardware processors, cause the hardware processors to perform operations comprising:
   for a graph of nodes and directed edges respectively representing a plurality of software objects and pairwise dependencies therebetween, the directed edges collectively further representing cyclic dependencies among the software objects, generating a condensation of the graph having a topological order;
   wherein the condensation comprises a contracted node representing a strongly connected component of the graph;
   wherein the strongly connected component comprises a plurality of the nodes having, for each pair of distinct first and second nodes among the plurality of nodes, a first path leading from the first node to the second node and a second path leading from the second node to the first node, the first and second paths being along respective edges among the directed edges;
   wherein the contracted node represents the plurality of nodes of the strongly connected component and further represents corresponding objects among the software objects; and
   loading the software objects onto a target serially, according to the topological order.

11. The one or more non-transitory computer-readable media of claim 10, wherein the operations further comprise:
   building the graph of the nodes and the directed edges;
   identifying the strongly connected component within the graph; and
   determining the topological order of the condensation.

12. A system comprising:
   one or more hardware processors with memory coupled thereto; and
   computer-readable storage media storing instructions which, when executed by the one or more hardware processors, cause the one or more hardware processors to perform operations comprising:
      receiving a request to load a plurality of software objects having one or more cyclic dependencies;
      building a first graph comprising first nodes and directed edges, wherein the first nodes represent respective objects of the software objects, and wherein each edge of the directed edges joins a respective pair of the nodes and represents a dependency between the respective objects represented by the pair of the nodes;
      identifying one or more strongly connected components of the first graph comprising one or more disjoint respective subsets of the nodes and representing one or more corresponding subsets of the software objects;
      forming a directed acyclic second graph as a condensation of the first graph, the second graph comprising one or more second nodes, each second node of the one or more second nodes representing the corresponding subset of the software objects for a respective component of the one or more strongly connected components;
      determining a topological ordering of the second graph;
      generating a serial loading manifest of the software objects according to the topological ordering of the second graph, wherein the generating comprises:
         for any of the first nodes present in the second graph, placing an entry for the respective object in the serial loading manifest; and
         for each second node of the one or more second nodes:
            expanding the each second node into a serial list of the corresponding subset of the software objects; and
            placing the serial list in contiguous locations within the serial loading manifest;
      transmitting the serial loading manifest to a target; and
      loading the plurality of software objects serially as ordered in the serial loading manifest, wherein the loading operation is controlled, using the serial loading manifest, by the target.

13. The system of claim 12, wherein the target is a tenant in a cloud infrastructure.

14. The system of claim 12, wherein the one or more hardware processors are in a cloud-hosted content distribution network.

15. The system of claim 12, wherein the serial loading manifest identifies one or more repositories from which the plurality of software objects are loaded.

16. The system of claim 12, wherein each object of the software objects is accompanied by a respective document identifying the each object within the serial loading manifest.

17. The system of claim 16, wherein the corresponding subset of the software objects for a given second node of the second nodes comprises a first software object, and the document accompanying the first software object identifies the corresponding subset of the software objects for the given second node.

18. The system of claim 12, wherein the receiving, building, identifying, forming, determining, generating, and loading actions are performed by a content management service; and
   the loading is a push action to a target.

* * * * *